Oct. 28, 1958  H. K. HIRASUNA  2,857,834
EARTHWORKING TOOL
Filed Nov. 6, 1953
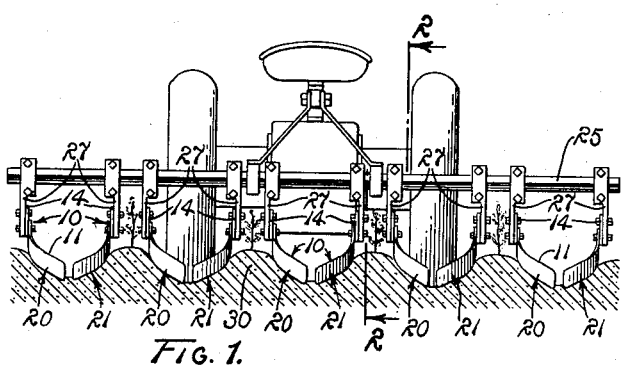
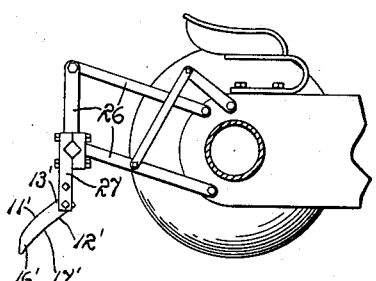
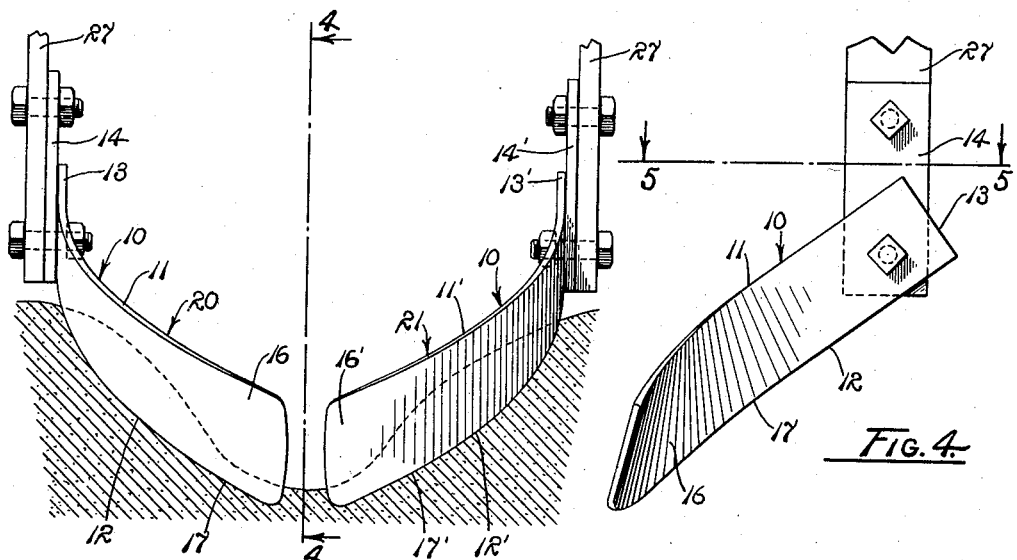
HENRY K. HIRASUNA
INVENTOR
HUEBNER, BEEHLER,
WORREL & HERZIG
ATTORNEYS
BY
Richard M. Worrel United States Patent Office 2,857,834
Patented Oct. 28, 1958

2,857,834

EARTHWORKING TOOL

Henry K. Hirasuna, Fresno, Calif.

Application November 6, 1953, Serial No. 390,595

2 Claims. (Cl. 97—144.1)

This invention relates to cultivators and more particularly to an improved earthworking and/or weed cutting tool.

In the cultivation of row crops, such as cotton, it is frequently necessary to scrape or shear weeds from the sides of adjacent hills or ridges on which the cotton plants or other crops are grown. This operation also facilitates the subsequent chopping, thinning or weeding of the rows by any of several conventional devices operable to effect successive, spaced, cutting strokes transversely of the rows. Many cultivating tools have been employed for the purpose but all have possessed difficulties which the present invention has overcome.

Generally, known tools of this nature comprise thin blades which are mounted on an elongated implement bar or draft frame which is attached to a tractor or the like for earth traversing movement between and along the rows being cultivated. The knife blade is adapted to scrape along the sides of the row containing the cotton or other crop so that the dirt and weeds are scraped and turned into the ditch or furrow between the hills or ridges forming the row. Because the blades are generally thin flat members and are angularly related to the direction of movement through the soil they have a tendency once having entered the soil to slide or shift laterally rather than to continue along the desired forward path of movement. This is known as side draft and the disadvantages thereof are obvious. When a knife engages its bank or ridge to an excessive depth, it has the effect of destroying the bank, oftentimes cutting the crop in its path. When knives of this nature are mounted in pairs or gangs, the effect is cumulative and instead of the gang of knives moving in a straight forward line between the rows, the entire gang has a tendency to undulate or weave laterally across the rows as the implement is drawn over the earth. Thus such tools have been unsatisfactory and incapable of achieving the precise control required for effective cultivation and weed elimination without crop damage.

Although it would appear that the immovable mounting of such tools on a draft appliance would avoid the difficulty, such has been found not to be the case. Draft appliances are not normally controlled nor controllable with the desired precision. Further, the position of mounting of such tools on tractors, carryalls, and the like is such that the slightest deviation from course results in an aggravated displacement of the tools because of the turning arms involved.

Therefore, it is an object of this invention to provide a tool of the general character described that resists side draft.

Another object is to provide an improved earthworking tool for row crops that is adapted for guided engagement with furrows and ridges along which it is drawn.

Another object is to provide earthworking tools adapted to be mounted in gangs or pairs so as to have cooperative effect in eliminating side draft.

Another object is to provide an earthworking tool having cooperative slicing and scraping portions adapted automatically to compensate for lateral thrusts during earth traversing movement.

Another object is to provide cooperative pairs of earth working tools which are respectively dextrorsely and sinistrorsely twisted each to provide earth slicing and scraping functions.

Additional objects are to provide improved elements and arrangements thereof in a cultivator of the character and for the purposes set forth.

Further objects and advantages will become apparent in the subsequent description in the specification.

In the drawings:

Fig. 1 is a rear elevation of the cultivating implement of the present invention attached to a tractor typifying draft appliances and other prime movers generally with which the implement is employed.

Fig. 2 is a fragmentary section taken on line 2—2 of Fig. 1.

Fig. 3 is a somewhat enlarged rearward elevation of a pair of the earthworking tools of this invention showing the manner in which they are mounted on an implement frame.

Fig. 4 is a side elevation of a single tool as seen from line 4—4 of Fig. 3.

Fig. 5 is a somewhat enlarged top view of the earthworking tool showing a portion thereof in cross section.

Referring to the drawings in greater detail, Fig. 1 shows the earthworking tools of this invention mounted on an implement frame which is attached to a tractor. In order to enable a better understanding of the operation of the tool in cooperation with similar tools, reference is first made to the significant form of the tools.

Accordingly, referring to Figs. 3, 4 and 5, it will be noted that the weed cutting tool comprises an elongated blade 10 having a pair of longitudinal edges 11 and 12. The upper end portion 13 of the blade is substantially flat and is provided with an opening therethrough for attachment to a shank 14 extending angularly therefrom. The end portion 16 opposite from the flat end portion 13 is curved outwardly from the plane of the flat end portion 13. It will be noted that the curvature of portion 16 is gradual from its connection to the flat portion 13 to the outer extremity of the blade. More specifically, the curvature of section 16 is in the form of a partial turn or convolution of a helix so twisted that in its preferable position of mounting, the upper longitudinal edge 11 at the outer extremity of the blade lies forwardly of the lower longitudinal edge 12 at said outer extremity. This is best seen in Fig. 5 and as the description proceeds, it will be seen that this feature eliminates or counteracts the forces incident to side draft on the tool and provides a guiding function of real significance. The lower edge 12 of the tool is preferably sharpened to provide a knife edge 17.

Since the tools are intended to be mounted in pairs, it is to be understood that tools so paired are oppositely related or constructed. Thus if one is sinistrorsely twisted the other is dextrorsely twisted. Referring to Fig. 3, a pair of tools are shown from the rear as they are mounted on an implement bar or frame. It will be evident that the tool as shown in Fig. 4 because of its particular curvature would be mounted on the left as seen in Fig. 3. The tool mounted on the right, as shown in Fig. 3, is oppositely curved with respect to its mating tool in the particular pair under consideration. For example, the tool 20 at the left in Fig. 3 is not only longitudinally arcuate to provide a concave side disposed forwardly and to the right but it is sinistrorsely twisted from its rearward end to its forward and relatively upper end through approximately 60° of a helical convolution. Conversely, the tool 21 at the right of Fig. 3 is longitudinally arcuate, presenting a concave side disposed forwardly and to the left, and is dextrorsely twisted from its rearward end to its forwardly and relatively upper end through approximately 60° of a convolution of a helix. It will be seen that in extending through approximately 60° of a helix the upper edge of the blade defines a fragment of a helix of somewhat smaller radius than that defined by the lower edge so that the upper edge is forward of the lower edge at the rearward end portion of the blade. As will become evident, greater or lesser helical progression may be utilized without departing from the spirit or the scope of the invention and satisfactory results nevertheless attained within the present concept. Similarly, while the longitudinally arcuate configuration of the blades, as demonstrated in Fig. 5, is through approximately 90° such extent of curvature may likewise be modified somewhat. To indicate that the tools are similar except for opposite curvature, like numbers are employed to designate particular portions of reference on all the tools with a prime designation added to tools of sinistrorsal curvature.

With reference to Figs. 1 and 2, the mounting of the tools on an implement bar or draft frame 25 will be noted. Bar 25 extends transversely of the direction of earth traversing movement of the prime mover and is connected thereto by conventional linkage means indicated at 26. Bar 25 is provided along its length with a plurality of dependent mounting arms 27. Each of the arms 27 is adjustable longitudinally of bar 25 and at its lower end is provided with bolt means or the like for attachment to the shank 14 of the implement cutting tool. The shank 14 extends downwardly from the arm 27 and lies in a vertical plane which is in substantial alignment with the direction of movement of the prime mover to achieve a slicing effect. The blade 10 of the tool extends rearwardly and downwardly from the shank 14 at approximately 45° relative to the horizontal and relative to the plane in which shank 14 lies. The curved end portion 16 of each blade extends in a lateral direction. Because of the helical curvature given to each of the blades, the upper edges 11 and 11' of blades 20 and 21, respectively, at the outer extremities of each blade, lie forwardly of the lower edges 17 and 17' at said outer extremities. Thus each blade at the outer extremity thereof tends to face angularly downwardly into the ground in the position of mounting shown. Considering a pair of blades, as 20 and 21 in Fig. 3, it will be noted that these blades are so positioned by means of their mounting arms 27 that they lie in spaced relation in the ditch between adjacent rows. Furthermore, as described above, these blades curve inwardly toward each other and are positioned so that the cutting edge 17 of each of the blades cuts into the side of the hill or row adjacent thereto. Obviously, therefore the face of each blade is adapted to turn the soil cut by the blade over into the ditch between the rows.

As the entire cultivator is moved along in earth traversing fashion, there is a tendency for the blade 20, for example, to move laterally into its adjacent row 30 because of side draft. However, because the blade is provided with a helical curvature in which an upper longitudinal edge 11 advances relatively inwardly of the lower longitudinal edge 12 in downward and rearward helical progression, objectionable side draft is avoided.

In further explanation of this effect, it should be noted that the forward end portion of each blade 10 comprises a flat portion 13 located in a vertical plane substantially aligned with the normal direction of movement of the cultivator. This portion of the blade presents a lower knife edge 12 which is extended downwardly and rearwardly and exercises a slicing effect on the soil during earth traversing movement. The knife edge 12 is preferably approximately 45° in angular relation to the horizontal. Inasmuch as the forward portion is substantially flat and disposed as described, it has a keel-like guiding influence when drawn through soil.

As the blades 10 are curved downwardly and inwardly with respect to their companion blades, they constitute mold boards which serve to roll encountered earth sliced by the edges 12 inwardly into a previously formed furrow along which they are drawn. It is of course evident that such soil acts as a barrier to the blades and imposes opposite lateral forces on the blades. Although such lateral forces are opposite and therefore tend to compensate for each other, it is more significant that they are each overcome by the compensating and guiding effect of their lower ends 16. It will be noted in Figs. 4 and 5 that the blades are sufficiently twisted that the upper edges 11 thereof are substantially in advance of the lower edges at the rearward ends. For example, at the extreme rearward ends of the blades they are transversely disposed to the normal direction of movement of the cultivator and are tipped forwardly approximately 15° from the vertical. So formed, the rearward end portions of the blades exercise a scraping action of significance for guiding purposes. Although they ride over the earth turned inwardly by the blades they are dependably guided by the furrows and preclude the wandering of the tools from desired travel adjacent to the row crops and thus obviate the difficulties of prior known devices for the purpose.

Inasmuch as the plurality of pairs of tools are mounted in predetermined relation along the bar 25, they exercise a cooperative guiding effect. Since no blade can depart from its precise relation to the other blades, it follows that no blade can be displaced from its precise desired line of travel without displacement of all of the blades. Inasmuch as the rearward end portions of all of the blades tend to hold their respective blades in precise position in their furrows, any tendency of a single blade to displace the entire cultivator is readily overcome.

The tools of the present invention are simple in form, economical to produce, and because of their described configuration effectively avoid the wandering tendencies of previous tools for the purpose and in actual operations have proved self-guiding in character when operated along the furrows and ridges normally provided in row crops.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an earth working tool having a shank mounted for earth traversing movement along a line of travel in predetermined direction in relation thereto, a substantially rectangular blade having a forward end portion, a rearward end portion, a lower edge, and an upper edge, the forward end portion of the blade being mounted on the shank in a substantially erect plane aligned with the direction of movement of the shank with the blade rearwardly and downwardly extended therefrom in approximately 45° relative to the horizontal, the blade in its rearward extension from the shank being twisted through approximately 60° and laterally bent through approximately a quarter of a circle whereby the rearward end of the blade is forwardly extended from the lower edge to the upper edge of the blade at an angle of approximately 15° relative to the vertical.

2. In an earth working tool having a shank mounted for earth traversing movement along a line of travel in predetermined direction in relation thereto, a twisted planar blade having a forward end portion, a rearward end portion, a lower edge, and an upper edge, the forward end portion of the blade being mounted on the shank in a substantially erect plane aligned with the direction of movement of the shank with the lower edge of the blade downwardly extended therefrom in approximately 45° relative to the horizontal, the blade extending rearwardly from the shank through approximately 60° of a helix with the upper edge of the blade defining a fragment of a helix of a somewhat smaller radius than that defined by the lower edge of the blade and the blade laterally bent through approximately a quarter of a circle, the upper edge of the blade being forward of the lower edge thereof at the rearward end portion of the blade.

References Cited in the file of this patent

UNITED STATES PATENTS

| | | |
|---|---|---|
| 261,499 | Turner | July 18, 1882 |
| 765,061 | Word | July 12, 1904 |
| 1,103,595 | Lotter | July 14, 1914 |
| 1,628,562 | Smith | May 10, 1927 |